United States Patent
Vasseur et al.

(10) Patent No.: US 8,452,572 B2
(45) Date of Patent: May 28, 2013

(54) DISTRIBUTED SAMPLE SURVEY TECHNIQUE FOR DATA FLOW REDUCTION IN SENSOR NETWORKS

(75) Inventors: Jean-Philippe Vasseur, Saint Martin d'Uriage (FR); Pascal Thubert, La Colle sur Loup (FR); Patrick Wetterwald, Mouans Sartoux (FR); Vincent Jean Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 314 days.

(21) Appl. No.: 12/272,389

(22) Filed: Nov. 17, 2008

(65) Prior Publication Data

US 2010/0125437 A1    May 20, 2010

(51) Int. Cl.
*G05B 23/02* (2006.01)
*H04L 45/02* (2006.01)
*H04L 29/08081* (2006.01)

(52) U.S. Cl.
USPC .......................... 702/188; 370/255; 709/208

(58) Field of Classification Search
USPC .......................... 702/188; 370/255; 709/208
See application file for complete search history.

(56) References Cited

U.S. PATENT DOCUMENTS

| | | | |
|---|---|---|---|
| 6,636,499 B1 | 10/2003 | Dowling | |
| 6,917,626 B1 | 7/2005 | Duvvury | |
| 7,190,678 B2 | 3/2007 | Thubert et al. | |
| 7,293,082 B1 | 11/2007 | Carew et al. | |
| 7,428,221 B2 | 9/2008 | Thubert et al. | |
| 7,444,145 B2 | 10/2008 | Diener | |
| 7,937,167 B1* | 5/2011 | Mesarina et al. | 700/78 |
| 2006/0159095 A1 | 7/2006 | Cook et al. | |
| 2007/0082677 A1 | 4/2007 | Donald Hart et al. | |
| 2007/0150565 A1* | 6/2007 | Ayyagari et al. | 709/223 |
| 2007/0165622 A1 | 7/2007 | O'Rourke et al. | |
| 2007/0186280 A1 | 8/2007 | Das et al. | |
| 2007/0260417 A1 | 11/2007 | Starmer et al. | |

OTHER PUBLICATIONS

Lee, Shane, GPS System Fundamentals; Presentation to Northwestern Polytechnic University, Oct. 26, 2006; http://www.npu.edu/seminars/files/Shane_Lee_10282006.pdf.*
G. Taubes, "Beyond Discovery, The Global Positioning System", Apr. 1997 National Academy of Sciences.*
J. McNamara, "GPS for Dummies", 2004 Wiley Publishing Company.*

* cited by examiner

*Primary Examiner* — Jonathan C Teixeira Moffat
*Assistant Examiner* — Regis Betsch
(74) *Attorney, Agent, or Firm* — Cesari and McKenna, LLP

(57) ABSTRACT

In one embodiment, a clustering device may determine one or more sensor clusters having a plurality of sensor devices that report similar data of a same data type in a sensor network. Accordingly, the clustering device may select a subset of the sensor devices in each respective sensor cluster as one or more representative devices, such that a sensor sink obtains data from only the representative devices.

17 Claims, 6 Drawing Sheets

TABLE 300

| SENSOR ID 305 | DATA TYPE 310 | DATA VALUE 315 | SENSOR LOCATION 320 |
|---|---|---|---|
| 1 | TEMP | 21°C | 1 |
| 2 | TEMP | 24°C | 1 |
| 3 | PRESSURE | 101.3 kPa | 1 |
| ⋮ | ⋮ | ⋮ | ⋮ |
| n | (TYPE) | (VALUE) | (LOCATION) |

ENTRIES 350

FIG. 3

| CLUSTER ID 325 | SENSOR ID 305 | DATA TYPE 310 | DATA VALUE 315 | SENSOR LOCATION 320 | REP. 330 |
|---|---|---|---|---|---|
| 1 | 1 | TEMP | 21°C | 1 | * |
| 1 | 2 | TEMP | 21°C | 1 | |
| 1 | 1022 | TEMP | 21°C | 1 | * |
| ... | ... | ... | ... | ... | ... |
| 2 | 3 | PRESSURE | 101.3 kPa | 2 | |
| 2 | 16 | PRESSURE | 101.4 kPa | 2 | * |
| 2 | 485 | PRESSURE | 101.1 kPa | 2 | |
| ... | ... | ... | ... | ... | ... |

TABLE 300, ENTRIES 350

FIG. 4

DISTRIBUTED SAMPLE SURVEY TECHNIQUE FOR DATA FLOW REDUCTION IN SENSOR NETWORKS

TECHNICAL FIELD

The present disclosure relates generally to computer networks, and, more particularly, to sensor networks.

BACKGROUND

In many sensor networks, such as for industrial and environmental applications, a large number of devices may be polled by a "sink" device to obtain data, or the devices may push the data to the sink. Because of the large number of devices, though, the polling or pushing of this much data is a difficult challenge and stress for the networks. One option consists of placing data aggregators in the network to summarize/fuse the data in order to reduce the amount of data. However, placing data aggregators in the network increases complexity, costs, and management.

BRIEF DESCRIPTION OF THE DRAWINGS

The advantages of the invention may be better understood by referring to the following description in conjunction with the accompanying drawings in which like reference numerals indicate identically or functionally similar elements, of which:

FIG. 3 illustrates an example table of sensor data;
FIG. 4 illustrates an example table of sensor data organized into clusters.

DESCRIPTION OF EXAMPLE EMBODIMENTS

Overview

Figure 1:
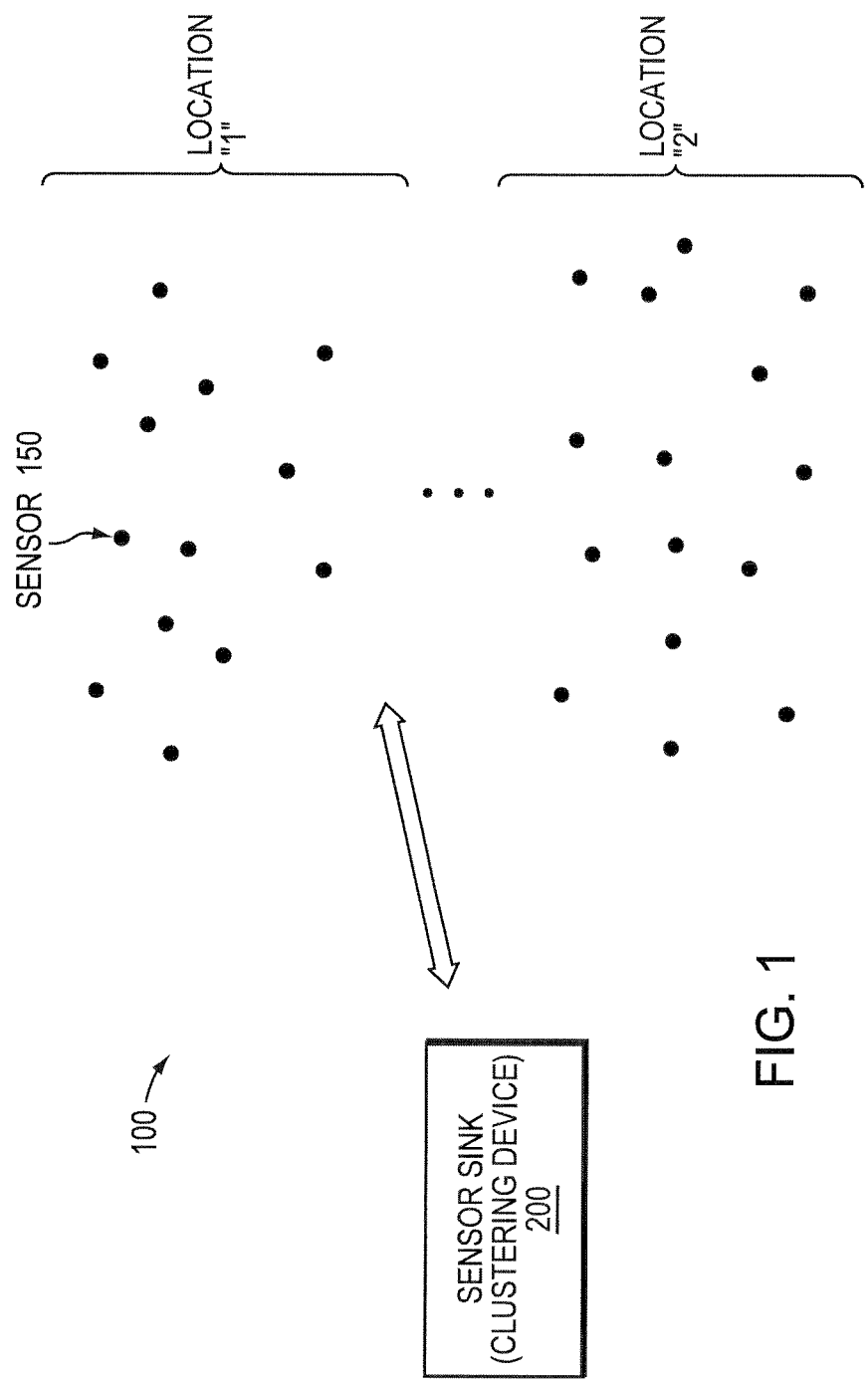
FIG. 1 illustrates an example sensor network.

According to embodiments of the disclosure, a clustering device may determine one or more sensor clusters having a plurality of sensor devices that report similar data of a same data type in a sensor network (e.g., based on gathering the data from all sensors). Accordingly, the clustering device may select a subset of the sensor devices in each respective sensor cluster as one or more representative devices, such that a sensor sink (e.g., the clustering device) obtains data from only the representative devices.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Sensor networks, in particular, are a specific type of network consisting of spatially distributed autonomous devices such as sensors that cooperatively monitor physical or environmental conditions at different locations, such as, e.g., temperature, pressure, vibration, sound, radiation, motion, pollutants, etc. Sensor networks are typically wireless networks, though wired connections are also available. That is, in addition to one or more sensors, each sensor device (node) in a sensor network may generally be equipped with a radio transceiver or other communication port, a small microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

Typically, the sensors in a sensor network transmit their data to one or more centralized database management nodes, or "sensor sinks" that obtain the data for use with one or more associated applications. In a "push mode," the sensors transmit their data to the sensor sink without prompting, e.g., at a regular interval or in response to external triggers. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network, or, more particularly, a sensor network 100, illustratively comprising nodes/devices, such as one or more sensor devices 150 of various locations (e.g., "1" and "2") and a sensor sink (e.g., and/or clustering device) 200 interconnected by links (not generally shown for clarity). Those skilled in the art will understand that any number of nodes, devices, links, etc. may be used in the computer network, and that the view shown herein is for simplicity. The links (not shown) may be wired links for electronic and/or optical transmissions, or may comprise a wireless communication medium, as will be appreciated by those skilled in the art (such as for wireless ad-hoc networks), where certain nodes 150 may be in communication with other nodes 150, e.g., based on distance, signal strength, current operational status, location, etc., or in direct communication with the sensor sink 200.

Data packets (e.g., traffic and/or messages sent between the sensors and sensor sink(s)) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, Multi-Protocol Label Switching (MPLS), various proprietary protocols, etc. In this context, a protocol consists of a set of rules defining how the nodes interact with each other.

Figure 2:
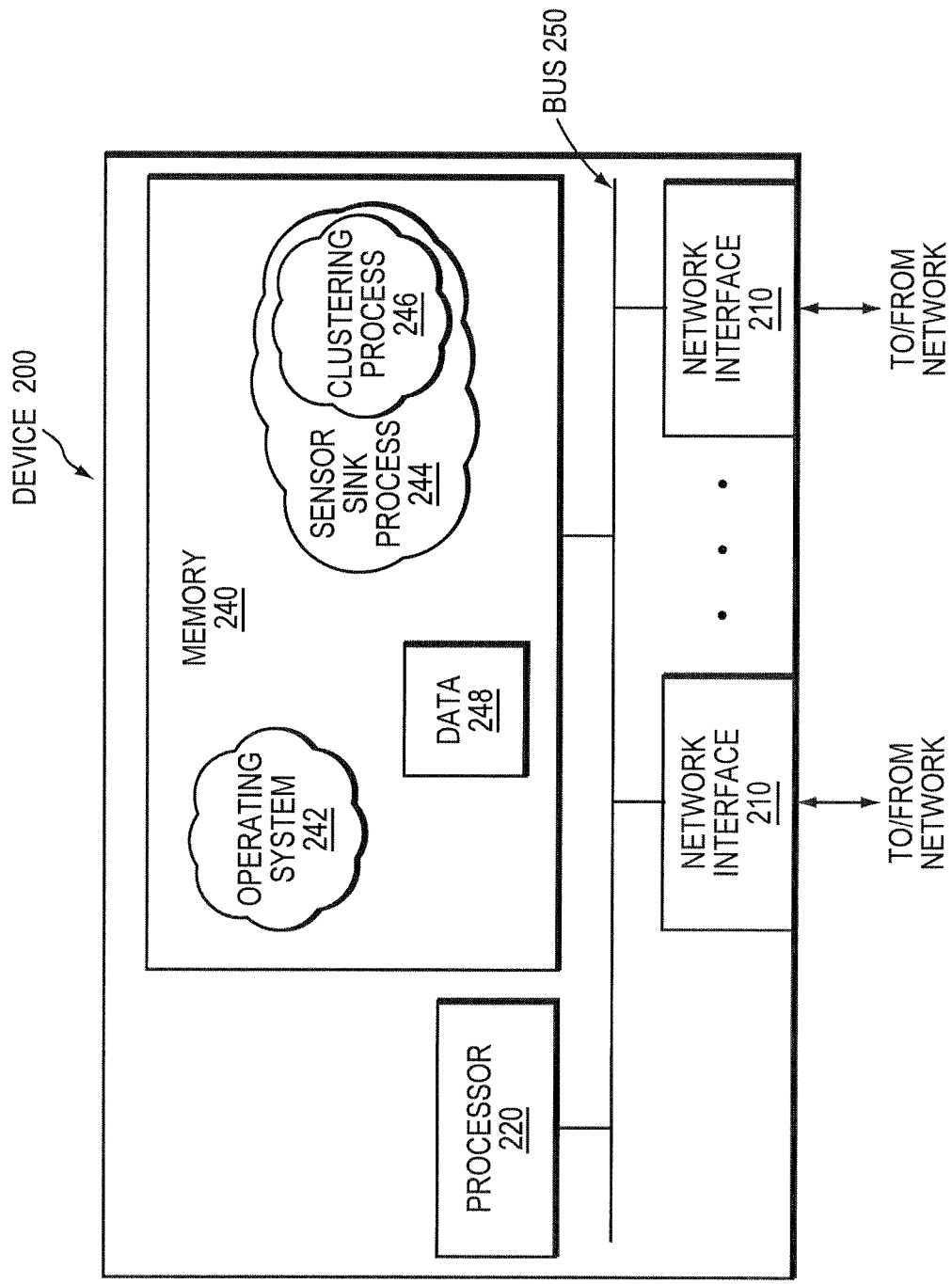
FIG. 2 illustrates an example device.

FIG. 2 is a schematic block diagram of an example node/device 200 that may be advantageously used with one or more embodiments described herein, e.g., as a sensor sink or clustering device 200 (which, notably, may but need not be the same device). The device comprises a plurality of network interfaces 210, a processor 220 (e.g., an 8-64 bit microcontroller), and a memory 240 interconnected by a system bus 250. The network interfaces 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, ATM, wireless protocols (e.g., IEEE Std. 802.14.5, WiFi, Bluetooth®,), Frame Relay, Ethernet, powerline converter (PLC) protocols, etc.

The memory 240 comprises a plurality of storage locations that are addressable by the processor(s) 220 and the network interfaces 210 for storing software programs and data structures associated with the embodiments described herein. The processors 220 may comprise necessary elements or logic adapted to execute the software programs and manipulate the data structures, such as data 249. An operating system 242, portions of which are typically resident in memory 240 and executed by the processor(s), functionally organizes the device by, inter alia, invoking operations in support of software processes and/or services executing on the device. These software processes and/or services may comprise, as described herein, a sensor sink process 244 and clustering process 246, or where a clustering device is separate from the sensor sink, then a separate clustering process 246 may be stored on the device as an alternative. It will be apparent to those skilled in the art that other processor and memory types, including various computer-readable media, may be used to store and execute program instructions pertaining to the inventive techniques described herein.

As noted above, in many sensor networks, such as for industrial and environmental applications, a large number of sensor devices may be polled by a sensor sink device to obtain data, or the devices may push the data to the sink. Because of the large number of devices, though, the polling or pushing of this much data is a difficult challenge and stress for the networks. In particular, excessive traffic may shorten the network life duration where battery operated devices are utilized. Assume, for example, that an illustrative network comprises over one million sensor devices, each configured to report data once every second; this results in one million data messages every second. One option consists of placing data aggregators in the network to summarize/fuse the data in order to reduce the amount of data. However, placing data aggregators in the network increases complexity, costs, and management.

Sensor Clustering

According to embodiments of the disclosure, therefore, sensors may be advantageously clustered into groups of similar data reporting sensors, from which one or more representative sensors to obtain primary data may be selected. The novel distributed sampled survey techniques thus reduce sensor network traffic and increase sensor life (e.g., battery power). Illustratively, the techniques described herein may be performed by hardware, software, and/or firmware, such as in accordance with a sensor sink process 246 having an associated clustering process 248 (or a separate clustering process 248, accordingly). That is, sensor sink process 246 and clustering process 248 may contain computer executable instructions executed by the processor(s) 220 to perform functions relating to sensor network operation as may be appreciated by those skilled in the art, and additionally functions relating to the novel clustering techniques described herein.

Operationally, the techniques described herein take advantage of the fact that there are often clusters of sensors in a large sensor network that report similar data. Unfortunately, in most cases it is difficult to determine which sensors will report similar data (which may be why so many sensors are being deployed in the first case). For example, assume that there are multiple sensors that repeatedly report a same value as one another, such as the temperature of a particular room. A clustering node, such as a central engine or a sensor sink 200, may initialize the clustering of sensors by gathering data from all sensors in the particular sensor network.

For instance, FIG. 3 illustrates an example table 300 storing the obtained data values (e.g., as "data 248"). The table 300 comprises a plurality of entries 350, each having one or more fields such as a sensor identification (ID) field 305, a data type field 310, a data value field 315, and optionally a sensor location field 320. Assume, for example, that a large number of sensors in FIG. 1 return their respective data values for a particular data type, such as temperatures, pressures, etc., and these values are stored in table 300 as shown. Those skilled in the art will appreciate that while table is shown, other arrangements of data storage may be utilized to store the gathered data and various associated information. Also, the associated information as shown is merely representative, and is not meant to limit the scope of the embodiments herein.

A statistical analysis may be used to identify clusters of sensors, such as based on a configured level of clustering. That is, based on the level of clustering (e.g., how similar data should be before clustering the reporting sensors), a clustering device may determine one or more sensor clusters in the network that have a plurality of sensor devices that report similar data of a same data type. In addition to manual configuration, such as identifying sensors of a same data type in a same location (e.g., "all temperature sensors in this location are to be clustered"), the novel techniques herein may use the obtained data from all of the sensors of the sensor network to determine the clusters.

Similar data, as used herein, generally describes data that falls within a given value range (e.g., temperature rounded to a nearest degree, vibrations less than a certain value, etc.), such that small variations in data values do not preclude clustering of the sensors. In particular, the configured level of clustering may be used to determine how broad the ranges in data values may be before a sensor may no longer be part of a cluster (i.e., a high level of clustering generates broader value ranges, and a low level of clustering generates narrower value ranges). Other criteria, such as the speed at which reported data changes over time, may also be used for a cluster selection.

Notably, the sensor location 320 is an optional classification, since clustering a group of sensors having the same temperature value but in different locations may not be optimal for all situations, such as where the locations are separated by a distance great enough to merit no correlation between the same temperature values other than a statistical anomaly. As such, "similar data" may include data that is from a same location, for example, based on a location identification carried in the data (configured, or dynamic, e.g., GPS). In addition, rules may be configured such that clustering an identified set of devices that are known to be highly independent may be avoided (e.g., devices that are clearly stand-alone devices in remote locations that may coincidentally report the same data as another remote device, etc.).

Moreover, various policies may be configured on the clustering device to download a set of clustering techniques that may be used to dynamically determine the clusters appropriate to the environment in which the clustering device is operating. For instance, what may be a suitable clustering technique in one sensor network may not be the most optimal in another. As an example, assume that one sensor network is measuring the pollutants found in a rain forest, but additional sensors have been put in place to measure vibrations for earthquake monitoring. The pollutant sensors may need to be more precise, frequent, and separated, while the vibration sensors may be clustered into large groups of sensors until an alarm is detected (a feature described below). On the other hand, a manufacturing plant may be more interested in vibration sensors than pollutant sensors, and thus the algorithms used in each environment may be different, and may change over time (without changing the sensors themselves).

FIG. 4 illustrates the example table 300 shown after an example clustering of sensors in the sensor network. For instance, an additional field, cluster ID field 325, may be added to the table to indicate in which cluster a particular sensor belongs (note that the table is shown reordered for ease of visualization, while those skilled in the art will appreciate that table entries 350 need not be in any particular order). For example, as shown, a plurality of sensors may be located in the same location "1" (e.g., a particular physical location), and may all be reporting the same temperature value. Also, within location "2", a collection of sensors may all be detecting the same pressure within a given range. As such, these two illustrative clusters (1 and 2) may be created, accordingly.

Once the clustering device determines the clusters of sensors, a representative set of sensors that are reporting data for each cluster may then be selected. That is, the clustering device may select a subset (i.e., one or more, but not all) of the sensor devices in each respective sensor cluster as one or more representative devices from which to obtain data. For instance, the representative devices for each subset may be selected based on a variety of factors, including random selection. Example non-random factors may include, inter alia, wireless sensor signal strength, sensor battery life, a power mode of the sensor (e.g., always on, rarely on), data detail provided by the sensor (e.g., certain sensors report less accurate data, or less information regarding the data, such as "temp hi" versus an actual value, etc.), data accuracy (e.g., where it is known that certain sensors provide more accurate data), and data update frequency (i.e., how often a particular sensor transmits new data).

Note that each cluster or each cluster of a particular data type may have a configurable number of representative devices. For instance, as shown in FIG. 4 (field 330), the temperature cluster may illustratively have more selected representative devices than the pressure cluster, e.g., where temperature readings are more vital than pressure readings in the example environment. The number of selected representative devices is thus based on a variety of reasons, and may be manually configurable or dynamically adjusted (e.g., based on the level of clustering or other factors).

Once the sensors are clustered and a representative subset of devices selected for each cluster, the sensor sink 200 (which may have been the clustering device) may obtain data from only the representative devices. In other words, depending on whether the sensor sink is operating in a push mode or a pull mode, the sink (or clustering device) may inform sensor devices of the sensor network that are not representative devices to cease sending data to the sensor sink (push mode), or may only poll the representative devices for the desired data (pull mode). Note that if in push mode, the representative sensors may also be requested to transmit their data at a different rate/frequency, e.g., more or less often, as desired.

Figure 5:
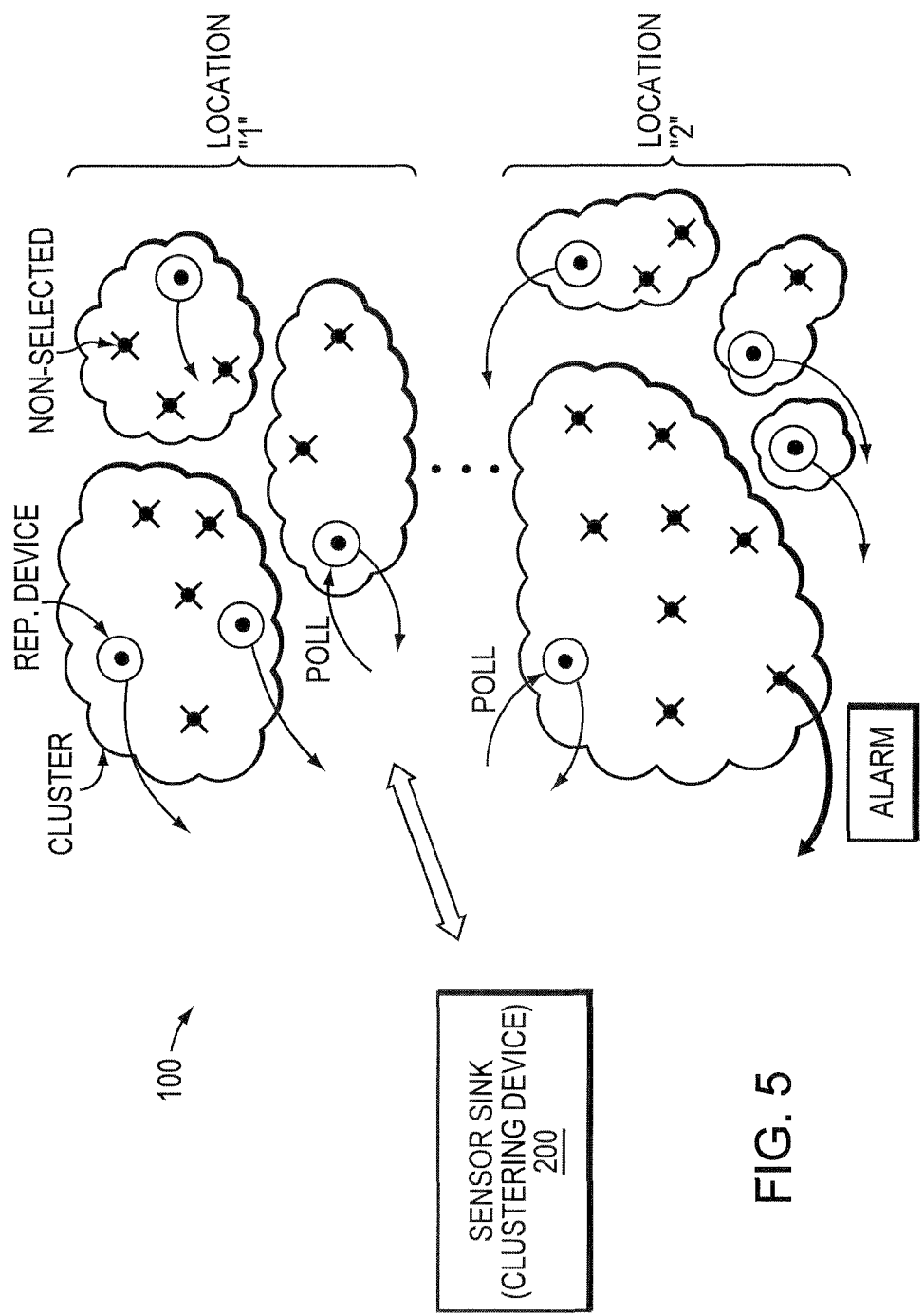
FIG. 5 illustrates an example sensor network showing sensor clusters.

FIG. 5 illustrates the example network 100 of FIG. 1 showing example "clusters" and representative devices that are either in pull mode or push mode (that is, the sensor sink may operate in pull mode for certain sensors, and push mode for others). Those skilled in the art should understand that the clustering arrangements shown in FIG. 5 assume that the sensors are physically located near each other for ease of visualization. However, the embodiments herein are not so limited, and any clustering arrangement may be created (though difficult to portray through imagery) in accordance with the techniques described herein.

Notably, locally configured alarms need not be affected by clustering, such that any sensor detecting an alarm may still transmit the alarm accordingly. As such, an alarm may be transmitted from a sensor device that is not a representative device to the sensor sink. Further, drastic changes in environmental conditions may be reported by devices (e.g., as an alarm or otherwise), thus triggering a reclustering event. Accordingly, the clusters may be re-determined (e.g., by obtaining data from all sensors again to determine sensors that may be clustered), or alternatively, the clustering features may be temporarily disabled, thus "un-clustering" the sensor devices and obtaining data from all sensor devices in the sensor network until a later time.

In accordance with one or more embodiments described herein, the subsets of representative devices may be periodically changed, to give each sensor a chance to update its data. In this manner, changes within a cluster may be monitored where not otherwise receiving data from all sensors. In particular, the clustering device may periodically reselect the representative devices for the sensor clusters based on a configurable timer or other factors. For instance, when the sensor sink operates in pull mode to poll sensor devices (e.g., in "poll periods" consisting of one or more polls to the representative devices), the sensor sink may cycle through each sensor device of each sensor cluster one-at-a-time (or a plurality-at-a-time) as selected representative devices for each poll period of the pull mode. In other words, assume that a cluster has ten associated sensors. The first poll (or first few polls) may be directed to a first sensor, while a second (few) may be directed to a second sensor, etc.

Further, it may also be beneficial to periodically re-determine the clusters themselves to account for environmental changes over time. For instance, the re-clustering may be performed upon expiration of a configurable timer at the clustering device by re-starting the clustering procedure to possibly optimize the clustering based on any changes since the last clustering decision has been made. For example, certain values in a particular area may have stabilized or may have become less stable, and re-clustering may be used to accommodate such changes (e.g., larger cluster groups in more stable environments, smaller and more accurate cluster groups in unstable environments).

Figure 6:
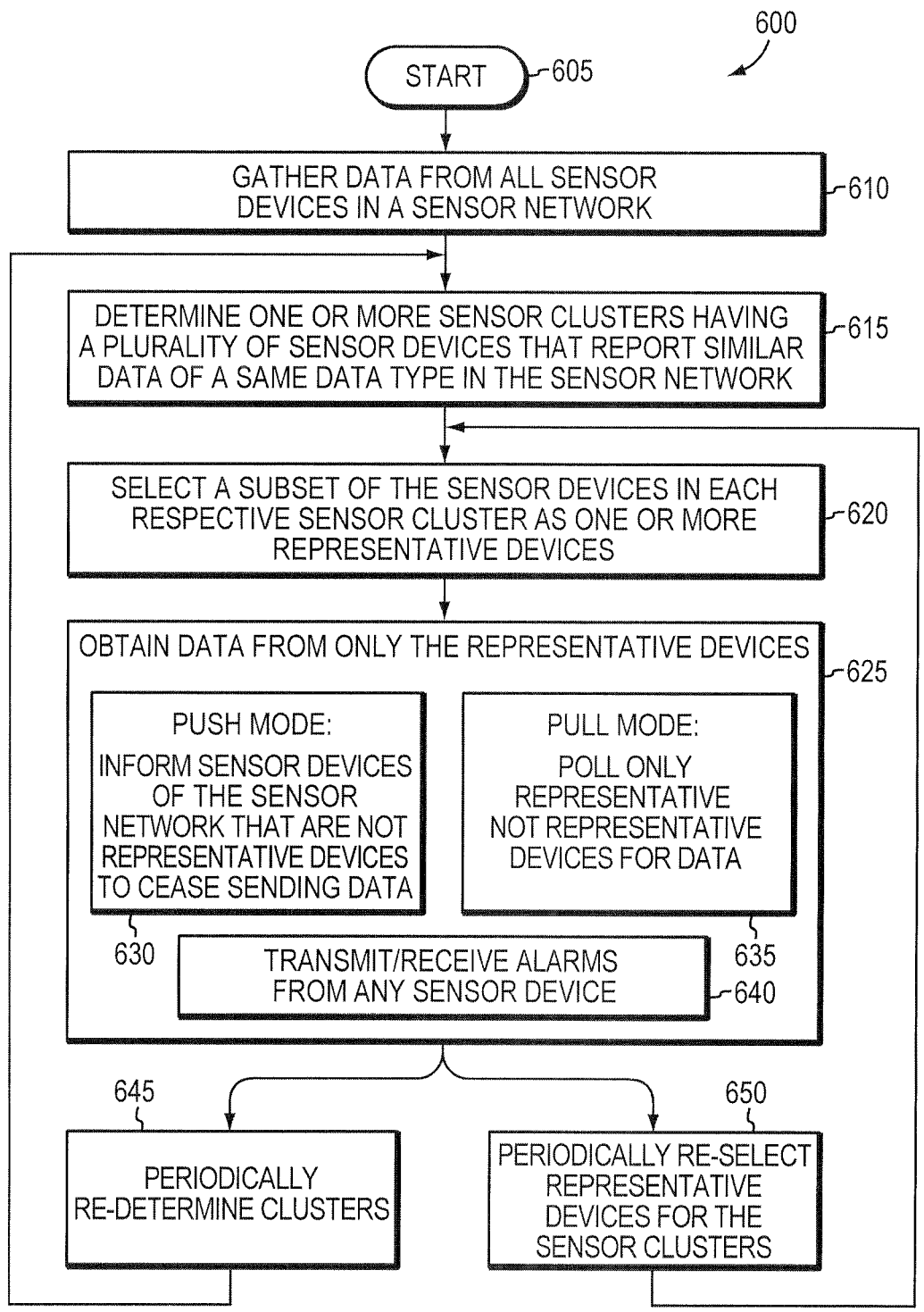
FIG. 6 illustrates an example procedure for sensor clustering.

As a brief restatement of an illustrative example, FIG. 6 illustrates an example procedure for sensor clustering in accordance with one or more embodiments described herein. The procedure 600 starts at step 605, and continues to step 610, where during an initial phase, a clustering device (e.g., a sensor sink 200) may gather data from all sensor devices 150 in a particular sensor network 100. From this data (or otherwise), the clustering device may determine in step 615 one or more sensor clusters having a plurality of sensor devices that report similar data of a same data type in the sensor network (e.g., the same value, from the same location, etc., as described above).

From here, in step 620, the device may select a subset of the sensor devices in each respective sensor cluster as one or more representative devices, such that in step 625, the sensor sink may obtain data from only the representative devices. In particular, as described above, in step 630 this implies that during a push mode, sensor devices of the sensor network that are not representative devices may be informed to cease sending data, while in step 635 this implies that during a pull mode that only representative devices are polled for data. Also, as noted, in step 640, any sensor device may still transmit an alarm to be received by sensory sink 200, accordingly.

In addition, in step 645, the clusters may be periodically re-determined, such as in response to a timer or other event/trigger (or de-clustered in response to an alarm or error), and also in step 650 the representative devices for the sensor clusters may be periodically re-selected as mentioned above.

Advantageously, the novel techniques described herein clusters sensors in a sensor network. By clustering sensors into similar data reporting sensors and selecting one (or more) from which to obtain primary data, the novel techniques reduce sensor network traffic and increases sensor life (e.g., battery power). In particular, the techniques described above are advantageous in networks with a very large number of inexpensive (low-capability) data points/sensors having a high probability of reported data that may be clustered. Also, the dynamic aspects of one or more embodiments described herein alleviate the need for cumbersome and inefficient manual configuration.

While there have been shown and described illustrative embodiments that clusters sensors in a sensor network, it is to be understood that various other adaptations and modifications may be made within the spirit and scope of the present invention. For example, the embodiments have been shown and described herein for use with certain modes or models of sensor network operation. However, the embodiments of the invention in their broader sense are not so limited, and may, in fact, be used with any similarly arranged network configured to obtain a large amount of data that may be clustered, as described above, for transmission to a particular sink device. Also, while certain types of data and certain reasons for clustering and selecting sensor devices have been shown, other types and reasons may be used in accordance with the techniques described herein, and those mentioned herein are merely representative examples that are not meant to limit the scope of the embodiments herein.

For example, while re-determining clusters is described above as being in response to a periodic timer or an alarm situation, other reasons to re-determine clusters may exist. Illustratively, therefore, clusters may be re-determined in response to one or more re-clustering triggers, such as detecting that the data received is no longer similar. For instance, as noted above, one embodiment polls each device of a cluster in a "round-robin" fashion. If in the event the polling device (sink) determines that the data is becoming dissimilar (e.g., vastly different, or other reasons to assume that there is not an actual dependency between the devices of the cluster), then the clusters may be re-determined, accordingly.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, 1 comprising:
    gathering data from a plurality of sensor devices in a sensor network that monitors a plurality of different physical or environmental conditions, each sensor device configured to monitor a respective physical or environmental condition of the plurality of different physical or environmental conditions and report data having a data type corresponding to the respective physical or environmental condition that the sensor device monitors;
    determining, by a clustering device, a plurality of sensor clusters in the sensor network, each sensor cluster associated with a different data type and including a plurality of sensor devices that report similar data of the data type associated with the sensor cluster;
    selecting, by the clustering device, a subset of the sensor devices in each respective sensor cluster as one or more representative devices;
    providing, to a sensor sink, data reported by the one or more representative devices of each sensor cluster that is descriptive of monitoring performed at the one or more representative devices, while not providing data from one or more other sensor devices of the sensor cluster that are not representative devices to the sensor sink, until the plurality of sensor clusters are re-determined or un-clustered, or the representative devices are re-selected;
    subsequent to the providing, receiving an alarm from a sensor device of a particular sensor cluster that is not a representative device indicating a change in the physical or environmental condition that the sensor device monitors;
    in response to the alarm, un-clustering the sensor devices of the particular sensor cluster; and
    providing, to the sensor sink, data reported by the plurality of sensor devices that were once in the particular sensor cluster and that are now operating un-clustered.

2. The method as in claim 1, wherein 1 the determining uses the gathered data to determine the sensor clusters.

3. The method as in claim 1, wherein similar data is data having values that fall within a value range selected by the clustering device.

4. The method as in claim 1, wherein similar data is data from a same location selected by the clustering device.

5. The method as in claim 4, wherein the location is based on a location identification carried in the data.

6. The method as in claim 1, wherein the clustering device is the sensor sink.

7. The method as in claim 1, further comprising:
    operating the sensor sink in a push mode; and
    informing sensor devices of the sensor network that are not representative devices to cease sending data to the sensor sink.

8. The method as in claim 1, further comprising:
    operating the sensor sink in a pull mode; and
    polling only representative devices for data.

9. The method as in claim 1, further comprising: 2 periodically re-determining the sensor clusters.

10. The method as in claim 1, further comprising:
    re-determining the sensor clusters in response to a re-clustering trigger.

11. The method as in claim 1, further comprising:
    periodically re-selecting the representative devices for the sensor clusters.

12. The method as in claim 11, wherein the sensor sink operates in pull mode to poll sensor devices in poll periods, the method further comprising:

cycling through each sensor device of each sensor cluster one-at-a-time as selected representative devices for each poll period of the pull mode.

13. The method as in claim 1, wherein a subset is one sensor device of the plurality of sensor devices in a sensor cluster.

14. The method as in claim 1, further comprising:
selecting the representative devices for each subset based on a factor selected from a group consisting of: signal strength; battery life; power mode; data detail; data accuracy; and data update frequency.

15. An apparatus, comprising:
one or more network interfaces adapted to communicate with a plurality of sensor devices in a sensor network that monitors a plurality of different physical or environmental conditions, each sensor device to monitor a respective physical or environmental condition of the plurality of different physical or environmental conditions;
a processor coupled to the network interfaces and adapted to execute one or more processes; and
a memory adapted to store a sensor sink process executable by the processor, the sensor sink process when executed operable to:
gather data from the plurality of sensor devices in the sensor network, the data gathered from each sensor device having a data type corresponding to the respective physical or environmental condition that the sensor device monitors;
determine a plurality of sensor clusters in the sensor network, each sensor cluster associated with a different data type and including a plurality of sensor devices that report similar data of the data type associated with the sensor cluster;
select a subset of the sensor devices in each respective sensor cluster as one or more representative devices;
obtain data reported by the one or more representative devices of each sensor cluster that is descriptive of monitoring performed at the representative devices, while not obtaining data from one or more other sensor devices of the sensor cluster that are not representative devices, until the plurality of sensor clusters are re-determined or un-clustered, or the representative devices are re-selected;
subsequently receive an alarm from a sensor device of a particular sensor cluster that is not a representative device indicating a change in the physical or environmental condition that the sensor device monitors;
in response to the alarm, un-cluster the sensor devices of the particular sensor cluster; and
obtain data reported by the plurality of sensor devices that were once in the particular sensor cluster and that are now operating un-clustered.

16. The apparatus as in claim 15, wherein the sensor sink process when executed is further operable to:
initially gather data from all sensor devices in the sensor network; and
use the initially gathered data to determine the clusters.

17. A system, comprising:
a plurality of sensor devices in a sensor network that monitors a plurality of different physical or environmental conditions, each sensor device configured to monitor a respective physical or environmental condition of the plurality of different physical or environmental conditions and report data having a data type corresponding to the respective physical or environmental condition that the sensor device monitors;
a clustering device configured to determine a plurality of sensor clusters in the sensor network, each sensor cluster associated with a different data type and including a plurality of sensor devices that report similar data of the data type associated with the sensor cluster, and to select a subset of the sensor devices in each respective sensor cluster as one or more representative devices, the clustering device further configured to subsequently receive an alarm from a sensor device of a particular sensor cluster that is not a representative device indicating a change in the physical or environmental condition that the sensor device monitors, and in response to the alarm, un-cluster the sensor devices of the particular sensor cluster; and
a sensor sink configured to obtain only data reported by the one or more representative devices of each sensor cluster that is descriptive of monitoring performed at the representative devices, and to not obtain data from one or more other sensor devices of the sensor cluster that are not representative devices, until the plurality of sensor clusters are re-determined or un-clustered, or the representative devices are reselected, the sensor sink further configured to obtain data reported by the plurality of sensor devices that were once in the particular sensor cluster and that are now operating un-clustered after the particular sensor cluster is un-clustered.

* * * * *

UNITED STATES PATENT AND TRADEMARK OFFICE
CERTIFICATE OF CORRECTION

PATENT NO.         : 8,452,572 B2                           Page 1 of 1
APPLICATION NO.    : 12/272389
DATED              : May 28, 2013
INVENTOR(S)        : Jean-Philippe Vasseur et al.

It is certified that error appears in the above-identified patent and that said Letters Patent is hereby corrected as shown below:

In the Claims:

In col. 8, line 2 should read:
1. A method, ~~1~~ comprising:

In col. 8, line 38 should read:
2. The method as in claim 1, wherein ~~1~~ the determining In col. 8, line 57 should read:
9. The method as in claim 1, further comprising: ~~2~~ periodi- In col. 10, line 34 should read:
A sensor sink configured to obtain ~~only~~ data reported by the Signed and Sealed this
Thirtieth Day of July, 2013

Teresa Stanek Rea
*Acting Director of the United States Patent and Trademark Office*